(12) United States Patent
Hagen (10) Patent No.: US 9,479,524 B1
(45) Date of Patent: Oct. 25, 2016

(54) DETERMINING STRING SIMILARITY USING SYNTACTIC EDIT DISTANCE

(71) Applicant: TREND MICRO INCORPORATED, Tokyo (JP)

(72) Inventor: Josiah Hagen, Austin, TX (US)

(73) Assignee: Trend Micro Incorporated, Tokyo (JP)

( * ) Notice: Subject to any disclaimer, the term of this patent is extended or adjusted under 35 U.S.C. 154(b) by 0 days.

(21) Appl. No.: 14/679,757

(22) Filed: Apr. 6, 2015

(51) Int. Cl.
| | |
|---|---|
| *H04L 29/06* | (2006.01) |
| *H04L 29/12* | (2006.01) |
| *G06F 11/00* | (2006.01) |
| *G06F 12/14* | (2006.01) |
| *G06F 12/16* | (2006.01) |
| *G08B 23/00* | (2006.01) |

(52) U.S. Cl.
CPC ....... *H04L 63/1416* (2013.01); *H04L 61/1511* (2013.01)

(58) Field of Classification Search
None
See application file for complete search history.

(56) References Cited

U.S. PATENT DOCUMENTS

| | | | |
|---|---|---|---|
| 8,707,426 | B1 | 4/2014 | Ramzan et al. |
| 9,245,121 | B1 * | 1/2016 | Luo ......................... G06F 21/56 |
| 2009/0037399 | A1 | 2/2009 | Bartz et al. |
| 2012/0084860 | A1 * | 4/2012 | Cao ..................... H04L 63/1441 726/23 |
| 2013/0191915 | A1 * | 7/2013 | Antonakakis ........... H04L 63/14 726/23 |
| 2014/0075558 | A1 * | 3/2014 | Ward .................. H04L 63/1425 726/23 |
| 2015/0067839 | A1 * | 3/2015 | Wardman .............. G01F 11/262 726/22 |
| 2015/0264070 | A1 * | 9/2015 | Harlacher ........... H04L 63/1441 726/23 |
| 2016/0036836 | A1 * | 2/2016 | Grill ..................... H04L 67/104 726/23 |
| 2016/0057165 | A1 * | 2/2016 | Thakar .................... G06F 21/56 726/24 |
| 2016/0099967 | A1 * | 4/2016 | Stemm ............... H04L 63/1458 726/1 |

FOREIGN PATENT DOCUMENTS

WO   WO-2013009713 A2   1/2013

OTHER PUBLICATIONS

Krishnan, S. et al., "Crossing the Threshold: Detecting Network Malfeasance via Sequential Hypothesis Testing," (Research Paper), May 27, 2013, 12 pages.
Linari, A. et al., "Typo-Squatting: The \Curse of Popularity," (Research Paper), Mar. 4, 2009, 5 pages.

* cited by examiner

*Primary Examiner* — Shin-Hon Chen
(74) *Attorney, Agent, or Firm* — Okamoto & Benedicto LLP (57) ABSTRACT

Examples relate to determining string similarity using syntactic edit distance. In one example, a computing device may: receive domain name system (DNS) packets that were sent by a client device, each DNS packet specifying a domain name; generate, for each domain name, a syntax string by replacing each character of the domain name with one of a plurality of metacharacters, each metacharacter representing a category of characters that is different from each other category of characters represented by each other metacharacter; determine, for each domain name, a syntactic edit distance between the domain name and each other domain name, the syntactic edit distance between domain names being determined based on syntax strings of the corresponding domain names; cluster each domain name into one of a plurality of clusters based on the syntactic edit distances; and identify the client device as a potential source of malicious software based on the clusters.

15 Claims, 4 Drawing Sheets

FIG. 3

DETERMINING STRING SIMILARITY USING SYNTACTIC EDIT DISTANCE

BACKGROUND

Computer networks and the devices that operate on them often experience problems for a variety of reasons, e.g., due to misconfiguration, software bugs, and malicious network and computing device attacks. Detecting and preventing the use and spreading of malicious software, for example, is often a priority for computer network administrators. Malicious software is increasingly designed to avoid detection using increasingly sophisticated methods.

BRIEF DESCRIPTION OF THE DRAWINGS

The following detailed description references the drawings, wherein.

DETAILED DESCRIPTION

The ability to determine similarity between strings facilitates a variety of analytical processes, including string clustering and pattern recognition. These analytical processes may be used, for example, in the computer networking context, to detect abnormalities in domain name system (DNS) queries. Abnormal DNS query activity, as discussed in further detail below, may be indicative of malicious software activity. Accordingly, using domain name query similarities to cluster domain names and identify patterns may facilitate the identification of malicious software ("malware") operating on devices issuing the DNS queries.

DNS queries are a type of network traffic generally produced by a computing device operating on a computer network; the DNS queries include a string specifying a domain name and are addressed to a DNS server device for domain name resolution. The DNS server typically provides an IP address associated with the query domain name in response to the DNS query, e.g., a computing device that issues a DNS query for "www.example.com," may be provided with a response, from a DNS server, indicating the IP address associated with the "www.example.com," e.g., "123.456.789.012." While DNS queries may be produced by computing devices for many non-malicious purposes, some malware may use DNS queries for malicious purposes.

By way of example, malware may make use of a domain generation algorithm (DGA) to periodically generate domain names that can be used by command and control servers to provide infected computing devices with updates and/or commands. Malware makes use of DGAs, as opposed to static domains, to prevent the malware command and control servers from being blacklisted. An infected computing device may periodically attempt to reach out to a large number of randomly generated domain names, only a portion of which are registered to malware command and control servers. A network administrator's ability to detect a computing device that is using a DGA to generate a large number of randomly generated domain names may facilitate the identification of infected computing devices on the administrator's network.

In particular, a DNS query analyzing device may inspect DNS query packets sent from a client computing device. To identify and cluster similar domain names, the analyzing device may generate syntax strings for each domain name included in a DNS query by replacing each character of the domain name with a metacharacter that represents a category of characters, or syntactic group. After generating syntax strings for each domain name, the domain names can be clustered into groups of similar domain names using the syntax strings. By determining similarity and clustering based on syntax, rather than the actual characters, patterns, such as those used by DGAs may be detected.

For example, the syntax string for the domain name. "www.ABC123.com," may be "LLLPCCCDDDPLLL," where 'L' replaces lower-case letters, 'P' replaces punctuation, 'C' replaces capital letters, and 'D' replaces digits. The syntax string for a second domain name, "www.DYW846.com," using the same metacharacters, would be the same as that of the first domain name, e.g., "LLLPCCCDDDPLLL." When clustered according to similarity using the syntax strings, the two domain names would be deemed similar, even though many characters do not match. This type of clustering may help identify, for example, use of a DGA that creates pseudo-random domain names using three random capital letters followed by three random digits. Further details regarding the use of syntax strings to measure string similarity and cluster strings are discussed in the paragraphs that follow.

Figure 1:
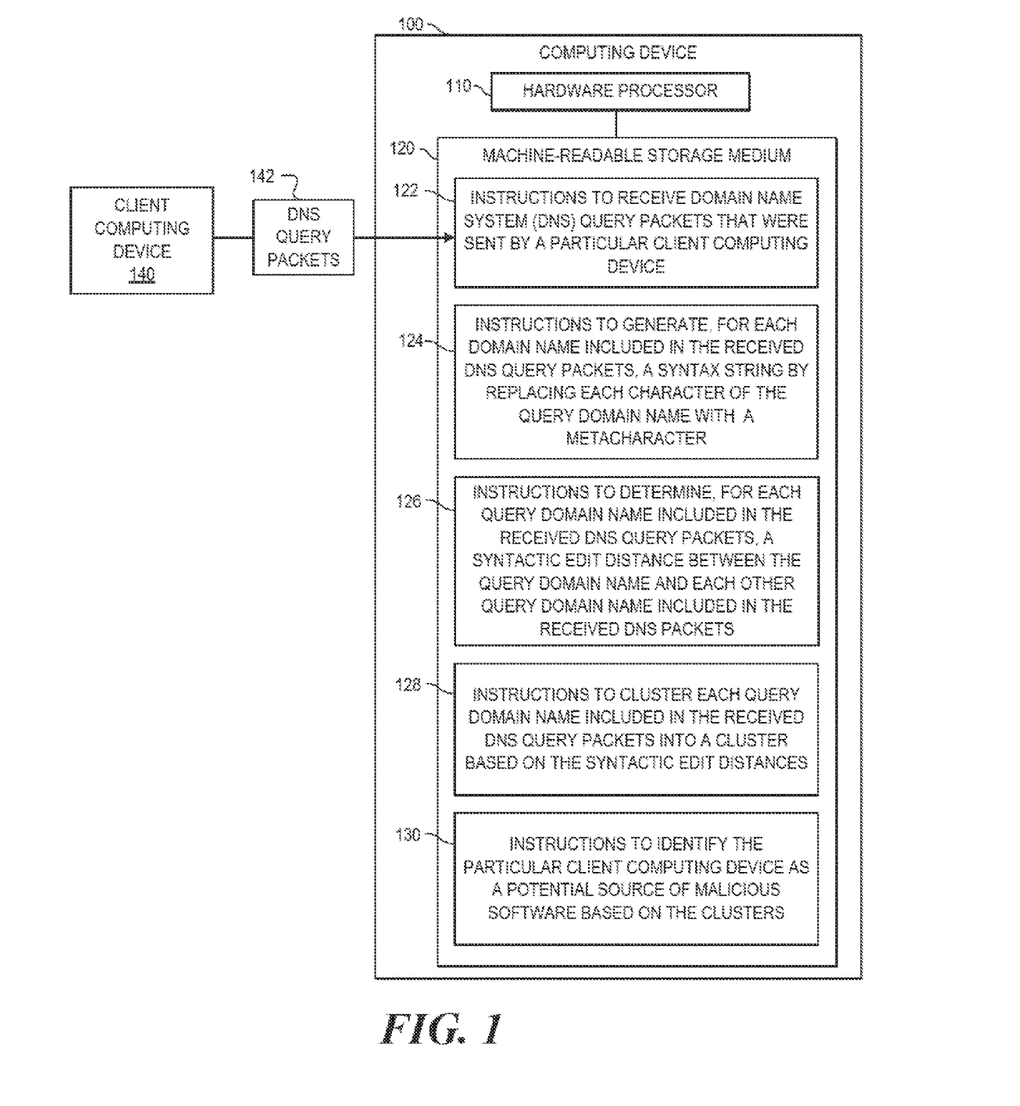
FIG. 1 is a block diagram of an example computing device for determining string similarity using syntactic edit distance.

Referring now to the drawings, FIG. 1 is a block diagram of an example computing device 100 for determining string similarity using syntactic edit distance. Computing device 100 may be, for example, a server computer, a personal computer, a mobile computing device, or any other electronic device suitable for processing network communications data. In the embodiment of FIG. 1, computing device 100 includes hardware processor 110 and machine-readable storage medium 120.

Hardware processor 110 may be one or more central processing units (CPUs), semiconductor-based microprocessors, and/or other hardware devices suitable for retrieval and execution of instructions stored in machine-readable storage medium 120. Hardware processor 110 may fetch, decode, and execute instructions, such as 122-130, to control the process for determining string similarity using syntactic edit distance. As an alternative or in addition to retrieving and executing instructions, hardware processor 110 may include one or more electronic circuits that include electronic components for performing the functionality of one or more of instructions.

A machine-readable storage medium, such as 120, may be any electronic, magnetic, optical, or other physical storage device that contains or stores executable instructions. Thus, machine-readable storage medium 120 may be, for example, Random Access Memory (RAM), an Electrically Erasable Programmable Read-Only Memory (EEPROM), a storage device, an optical disc, and the like. In some implementations, storage medium 120 may be a non-transitory storage medium, where the term "non-transitory" does not encompass transitory propagating signals. As described in detail below, machine-readable storage medium 120 may be encoded with a series of executable instructions: 122-130, for determining string similarity using syntactic edit distance.

As shown in FIG. 1, the computing device 100 executes instructions to receive DNS query packets 142 that were sent by a client computing device 140 (122). While FIG. 1 depicts the computing device 100 receiving the DNS query packets 142 directly from the client computing device 140, in some implementations, the DNS query packets 142 are received indirectly, e.g., through one or more intermediary devices, such as network routers and/or load balancers. The DNS query packets 142 may be received periodically, one at a time, and/or in batches, and each packet specifies a domain name.

The computing device 100 executes instructions to generate, for each domain name included in the received DNS query packets 142, a syntax string by replacing each character of the query domain name with a metacharacter. Each metacharacter represents a category of characters, and the category represented by a metacharacter is different from the categories of other metacharacters. For example, the letter 'L' may be a metacharacter that represents all lower-case alphabetic letters, the letter 'C' may be a metacharacter that represents all capital letters, the letter 'D' may be a metacharacter that represents all numerical digits, and the letter 'P' may be a metacharacter that represents all punctuation marks. The metacharacter used, and the characters represented by the metacharacter, may vary, e.g., numbers, symbols, punctuation, and other characters may be used as metacharacters, and a variety of other character categories may be used, such as vowels, consonants, and Greek letters, to name a few.

By way of example, a DNS query packet may include the domain name, "www.1a2Bc3.com." Using the example metacharacters above, the syntax string for the foregoing domain name would be "LLLPDLDCLDPLLL." While the metacharacters and the categories they represent may vary, as noted above, other portions of the syntax string may also vary. In some implementations, the sub-domain and/or top level domain may be removed or condensed, e.g., due to their ubiquity. For example, metacharacters representing "www." and ".com" may be removed, leaving a syntax string of "DLDCLD." As another example, "www." and ".com" may be represented by a single metacharacter, e.g., a 'W' for "www." and a 'c' for ".com," leaving a syntax string of "WDLDCLDc." Other example categories of characters, which may be used separately or in combination with those above, include: alphabetical letters, vowel letters, consonant letters, non-English letters or characters, dashes, underscores, unprintable characters, and specific punctuation marks. Other subsets of the characters included in a domain name may be used to generate a syntax string for that domain name.

The computing device 100 executes instructions to determine, for each domain name included in the received DNS query packets 142, a syntactic edit distance between the domain name and each other domain name included in the received DNS query packets 142 (126). The syntactic edit distance between query domain names is determined based on the syntax strings of the corresponding domain names. For example, the syntactic edit distance between domain names may be determined based on an edit distance between the syntax strings of the corresponding domain names. Various edit distance methods may be used to determine the edit distance between two strings, e.g., Levenshtein, or LCS edit distance methods.

By way of example, a second domain name may be "home.example.net," which has a syntax string—using the above example metacharacters—of "LLLLPLLLLLLL-PLLL." The edit distance, using Levenshtein edit distance method, between this syntax string and the first syntax string above ("LLLPDLDCLDPLLL") is 6, e.g., four substitutions and two insertions. In some implementations, edit distance of syntax strings may be converted to a similarity value, e.g., relative to the edit distance of the domain names. For example, the edit distance between "www.1a2Bc3.com" and "home.example.net" is 13. An example similarity value for the two domain names may be calculated using the following formula: 1−(syntactic edit distance/edit distance). In this example, the resulting similarity value would be ~0.54(1−(6/13)). Other methods may also be used for determining syntactic similarity between strings.

In some implementations, a sorted syntax string is generated for each syntax string by sorting the metacharacters of each syntax string, and the sorted syntax string is used for determining syntactic edit distance and/or similarity. For example, the syntax string of the first domain name may be sorted into "CDDDLLLLLLLLLPP," while the second syntax string may be sorted into "LLLLLLLLLLLLLLPP." Though shown being sorted in alphabetical order, the order in which the metacharacters are sorted may vary. The edit distance between the two example sorted syntax strings is also 6. In implementations where similarity values are used, an example formula may be: 1−(sorted syntactic edit distance/edit distance). In this example, the resulting similarity value would be ~0.54(1−(6/13)). As with the similarity formula and calculation provided above, other methods may also be used for determining syntactic similarity between sorted syntax strings.

The computing device 100 executes instructions to cluster each query domain name included in the received DNS query packets 142 into a cluster based on the syntactic edit distances (128). In some implementations, one or more clustering methods may be used to generate clusters of domain names based on syntactic edit distances. For example, similarity measures, such as one calculated in the examples above, may be used to cluster domain names into clusters of other syntactically similar domain names. A variety of clustering and/or classification methods, or combinations thereof, may be used to cluster domain names. Example clustering methods include hierarchical clustering, centroid based clustering, distribution based clustering, and density based clustering.

The computing device 100 executes instructions to identify the client computing device 140 as a potential source of malicious software based on the clusters (130). In some implementations, the client computing device 140 may be identified as a potential source of malware in response to determining that one of the clusters includes a number of domain names that exceeds a threshold number of query domain names. The threshold number may, for example, be dynamic and depend upon the number of clustered domain names, e.g., a threshold of 30 domain names in a particular cluster may be used for a total of 100 clustered domain names, but a higher threshold may be appropriate when clustering 10.000 domain names.

As noted above, a high volume of DNS queries may be indicative of potentially malicious activity occurring on a client computing device. Other anomalies, or abnormal activity, in DNS query traffic may lead to identification of a device infected with malware or otherwise performing improperly. For example, with respect to malware that uses DGAs to issue DNS queries, recognizing patterns in the randomly generated domain names may facilitate identification of a client computing device that is infected. Clustering domain names by some measure of syntactic similarity and/or sorted syntactic similarity, rather than similarity of the actual domain names, may help identify patterns in DNS queries and/or the use of a DGA.

A variety of options may be used when performing clustering and cluster analysis to determine if DNS traffic originating from a client computing device is indicative of malware. For example, identification of a pattern need not be limited to identification of a single anomalous cluster, e.g., multiple clusters of an abnormal size—abnormally large and/or also small—may provide an indication of a DGA. In implementations where similarity between domain names is determined based on a subset of the domain name characters, the particular subset of characters used may be more or less indicative of malware or a DGA than others. For example, in some situations, using syntax strings and similarity measures are based on only sub-domains, or a sub-domain and domain name without a top level domain (TLD), may facilitate identification of DGAs or other DNS anomalies.

In some situations, the status of a particular domain name query and/or DNS server response may be used to perform clustering and analysis. For example, non-existent domains and/or sub-domains—detected by intercepting DNS server response packets or independently querying a DNS server—may be an additional feature upon which clustering and analysis is based. In some implementations, for example, only domain names and/or sub-domains that are non-existent are clustered based on syntactic similarity. This and other implementations may facilitate identification of malware that uses a DGA to reach out to many domains, only a few of which are actually registered, e.g., to malware command and control servers. In addition, while identification of an anomalous cluster or clusters of domain names may indicate a particular client computing device is infected with malware, the clusters may also be used to facilitate identification of malicious command and control servers. For example, in a situation where all domain names generated by a particular DGA fit into a specific number of clusters, domain names within those specific clusters that are actually registered may be in use by malicious command and control servers.

DGAs, while used by malicious software, may also be used by non-malicious entities. For example, a content serving network may use a DGA to generate random or pseudo-random sub-domains used to serve content to clients. In some situations, content serving networks may use a DGA having a regular or standard syntax. In this situation, a single cluster may include a large number of domain names and be anomalous, but not malicious. Malicious implementation of a DGA may be detected and distinguished from this type of non-malicious DGA use in situations where a malicious DGA doesn't use a standard syntax, but instead uses a DGA that results in syntax with relatively high variance. This may result, for example, in a relatively high number of clusters being formed which, in this situation, may be indicative of the use of a malicious DGA. Any of the above clustering and analysis methods, options, and features may be used in combination with other clustering and analysis methods, options, and features to facilitate identification of potential sources of malicious activity.

Figure 2A:
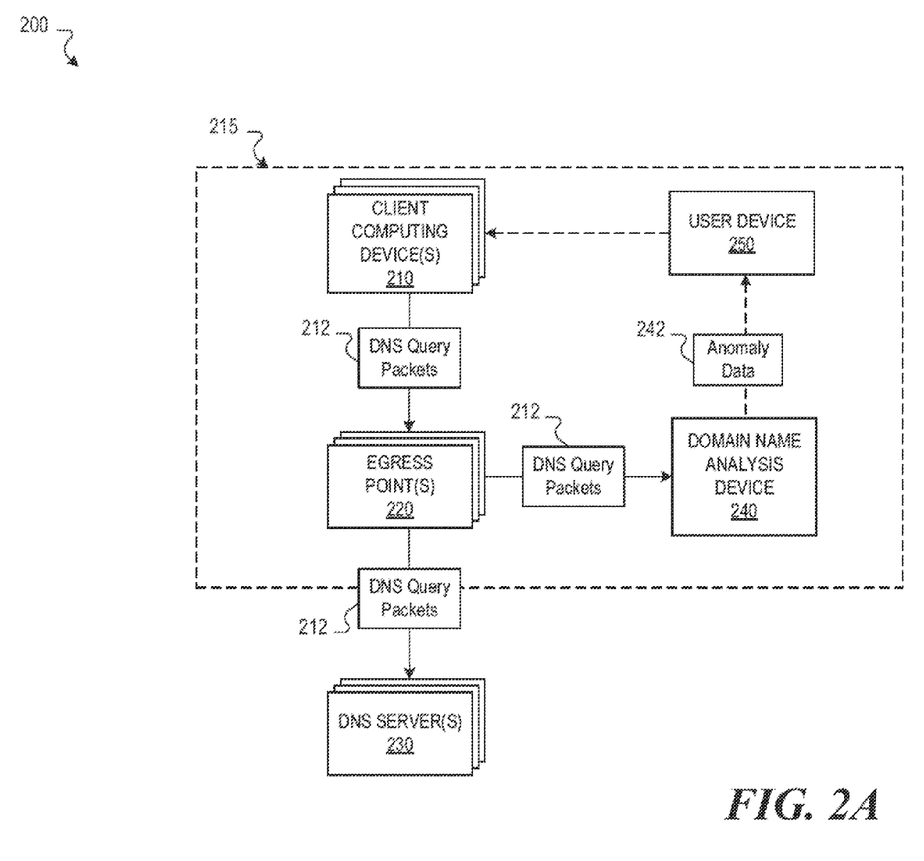
FIG. 2A is an example data flow for determining string similarity using syntactic edit distance.
Figure 2B:
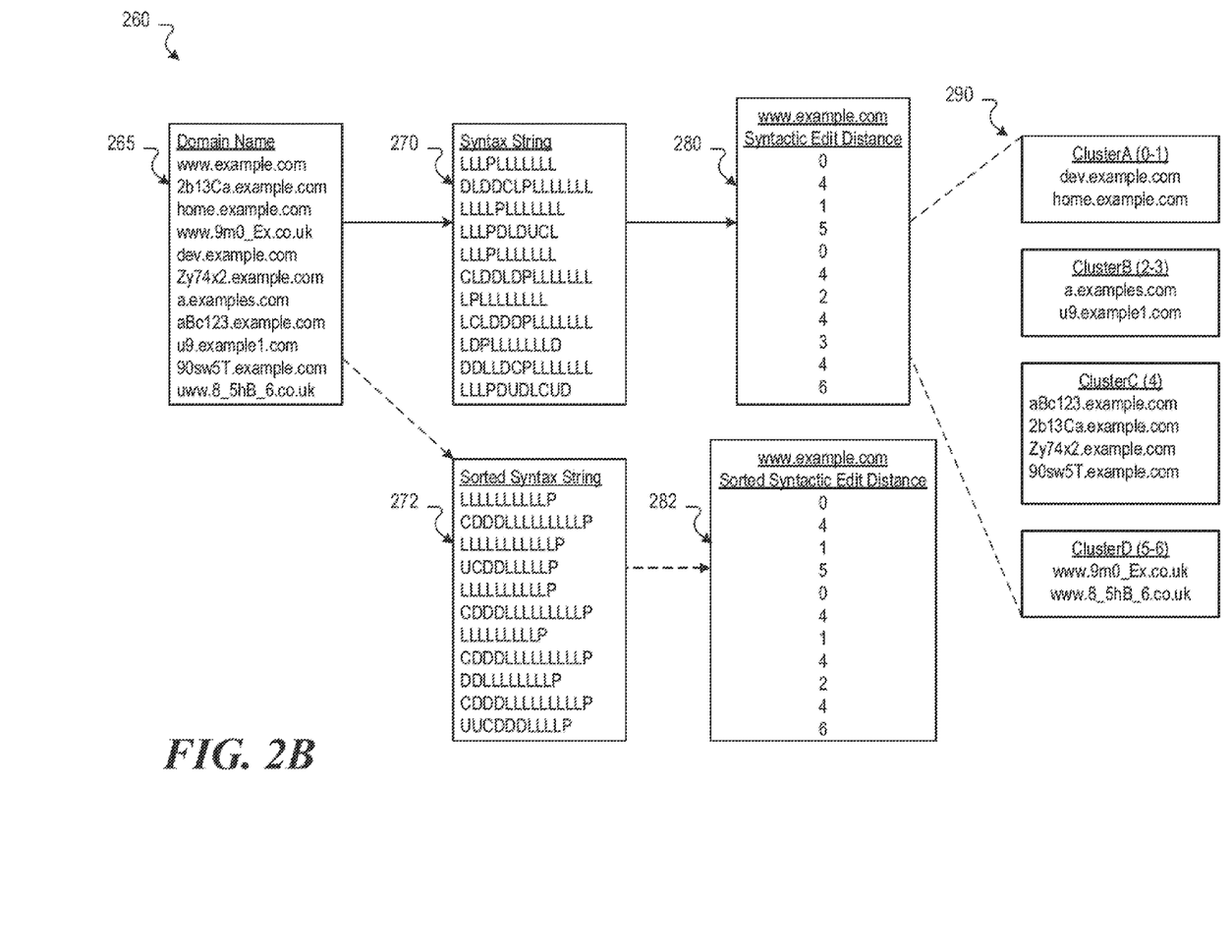
FIG. 2B is a representation of an example data flow for using syntactic edit distance to cluster domain names.

FIG. 2A is an example data flow 200 for determining string similarity using syntactic edit distance, and FIG. 2B is a representation of an example data flow 260 for using syntactic edit distance to cluster domain names. The data flow 200 depicts a domain name analysis device 240, which may be implemented by a computing device, such as the computing device 100 described above with respect to FIG. 1. The client computing device(s) 210 and user device 250 may be any computing device suitable for network communications, such as a personal computer, mobile computer, virtual machine, server computer, or any combination thereof. For example, the client computing device(s) 210 may be virtual machines operating within a private cloud computing network 215. The client computing device(s) 210 may be configured to perform various services and/or run various applications. By way of example, a client may rent computing resources, such as the client computing devices 210, from the operator of a cloud computing network, such as the network 215, for use in providing web services, such as an e-mail application, to end-users.

During their operation, client computing device(s) 210 may periodically communicate using various network communications protocols. DNS queries are one form of network communications that may originate from the client computing device(s) 210, e.g., in the form of DNS query packets 212. Each of the DNS query packets 212 is addressed to a DNS server which will perform domain name resolution on a particular domain name. For example, in a situation where the client computing device(s) 210 implement an e-mail application, a DNS query packet may be issued to identify the destination for an email addressed to "user@example.com."

Each of the DNS query packets 212 passes through an egress point 220 of the network 215. Egress point(s) 220 may be, for example, routers operating within the private network 215. In addition to forwarding DNS query packet(s) 212 to their destination DNS server(s) 230, the egress point(s) 220 also provide DNS query packets 212 to the domain name analysis device 240. The DNS query packets 212 provided to the domain name analysis device 250 may include all or a subset of the DNS query packets 212 provided by the client computing device(s) 210. In situations where multiple client computing devices managed by multiple clients and user devices, the domain name analysis device 240 may be provided with all of the DNS query packets, or with a subset, e.g., only queries from a single client computing device at a time. The example data flow 260 depicts example domain names 265 included in some example DNS queries provided to the domain name analysis device 240.

For each of the domain names 265, the domain name analysis device 240 generates a syntax string by replacing a subset of the characters of the domain name with one of multiple metacharacters. The resulting syntax strings 270 are depicted in the example data flow 260, where the letter 'L' represents all lower-case alphabetic letters, the letter 'C' represents all capital letters, the letter 'D' represents all numerical digits, the letter 'P' represents all periods, and the letter 'U' represents the underscore symbol. In the example data flow 260, the syntax strings 270 are generated without the top level domain and preceding period(s), e.g., without ".com," or ".co.uk."

In some implementations, as shown in the example data flow 260, the domain name analysis device 240 generates sorted syntax strings 272 for each syntax string. Each of the sorted syntax strings 272 is generated by sorting the metacharacters of each syntax string. A variety of methods may be used to sort syntax strings, e.g., alphabetically, reverse alphabetically, or according to user/administrator preferences. The example sorted syntax strings 272 are sorted alphabetically, with the exception that the 'U' representing an underscore symbol is first.

For each of the domain names 265, the domain name analysis device 240 determines a syntactic edit distance between the domain name and each other domain name included in the DNS query packets 218. As noted above, the syntactic edit distance between the domain name and each other domain name is determined based on the syntax string of the domain name and each syntax string of each other domain name. In the example data flow 260, the syntactic edit distances 280 are shown for the domain, "www.example.com." The edit distance between the syntactic string for "www.example.com" and the syntactic string for "2b13Ca.example.com," for example, is 4. The example data flow 260 also shows the sorted syntactic edit distances 282 for the domain, "www.example.com." Some of the sorted syntactic edit distances are the same as the syntactic edit distances, while others are different. Either or both distance measures may be determined by the domain name analysis device 240 for use in determining similarity between domain names.

Using the syntactic and/or sorted syntactic edit distances 280 and 282, the domain name analysis device 240 clusters each of the domain names 265 into one of multiple clusters 290. In the example data flow 260, domain names are clustered based on their syntactic edit distance from "www.example.com." E.g., each domain name in ClusterA has a syntactic edit distance of 0 or 1, each domain name in ClusterB has a syntactic edit distance of 2 or 3, each domain name in ClusterC has a syntactic edit distance of 4, and each domain name in ClusterD has a syntactic edit distance of 5-6. In implementations where sorted syntactic edit distance is used, the clusters 290 may be based on the sorted syntactic difference between domain names 265.

While the example data flow 265 depicts clusters 290 formed based on syntactic edit distance from one domain name, many variations and other clustering and/or classification algorithms, or combinations thereof, may also be used to cluster the domain names. For example, syntactic edit distances may be calculated for each domain name relative to all other domain names, and a clustering algorithm may use those distance measures to cluster the domain names.

In some implementations, the domain name analysis device 240 determines, for each domain name, measures of similarity to each other domain name. In this situation, domain names may be clustered using the similarity measures, in addition to or instead of using syntactic edit distances directly. For example, the domain name analysis device 240 may determine an edit distances between each pair of domain names and calculate the measure of similarity between them using the edit distance and the syntactic edit distance. One example formula may be:

$$\text{Similarity}=1-(\text{syntactic edit distance}/\text{edit distance}) \quad (1)$$

In implementations where sorted syntactic edit distances are used, the sorted syntactic edit distance may be substituted for the syntactic edit distance in the above example formula. Use of a similarity formula, like the example formula above, may facilitate in the identification of domain names that appear dissimilar, but are syntactically similar, and thus potentially related by being generated from the same DGA.

By way of example, the measure of similarity between "www.example.com" and "2b13Ca.example.com," using formula (1) above, is ~0.33(1−(4/6)). The measure of similarity between "www.example.com" and "90sw5T.example.com," using formula (1) above, is 0.2(1−(4/5)). The foregoing similarity values would be the same, in this example, if the sorted syntactic edit distance were used instead of syntactic edit distance. When calculating similarity between "2b13Ca.example.com" and "90sw5T.example.com," again using formula (1) above, the resulting measure of similarity is 0.5(1−(3/6)). This indicates that, even though the edit distance (6) between these domain names is at least as high as the distance between the domain names in the previous examples, these domain names are syntactically more similar to one another. When using sorted syntactic edit distance in formula (1), this because even more apparent, as the similarity measure between "2b13Ca.example.com" and "90sw5T.example.com" is 1(1−(0/6)). E.g., this indicates that the sorted syntax of the foregoing domain names is the same, using the above example metacharacters.

In implementations where similarity measures are calculated between domain names, the domain names may be clustered based on similarity measures, e.g., as opposed to using edit distances directly. A variety of similarity formulas and clustering algorithms, and combinations thereof, may be used to determine similarity between and cluster domain names.

Based on the clusters 290, the domain name analysis device 240 may determine the use of a DGA. In some implementations, other network anomalies may also detected, e.g., high DNS traffic volume. Use of a DGA may be determined, for example, based on the number of domain names in a particular cluster or dusters, relative to the number of domain names in the other clusters. For example, ClusterC of the clusters 290 has double the number of domain names in half of the edit distance range. In some implementations, this may trigger an anomaly. As noted above, a variety of cluster features may be used to detect a network anomaly, such as the use of a DGA, e.g., a relatively large number of clusters with a relatively large number of domain names in each, a single relatively large cluster, or a large number of clusters with relatively few domain names in each. In some implementations, various supervised and/or unsupervised machine learning techniques may also be used to determine cluster features that are indicative of network anomalies and/or DGAs.

In the example data flow 200, the domain name analysis device 240 provides anomaly data 242 to a user device 250. The user device 250, while depicted internally to the network 215, may in some implementations be external to the network 215. The user device 250 may be a network administrator device, e.g., one that exercises control over client computing device(s) 210, or a client device used by en entity to manage the client computing device(s) 210 from outside of the network 215. Anomaly data 242 may be used for a variety of purposes, e.g., for logging, for training an anomaly prediction module, or to take an action, e.g., notify a client of anomalous network activity and/or shut down a client computing device that is potentially infected with malware.

Various devices, such as the egress point(s) 220, domain name analysis device 240, and user device 250, are depicted separately in the example data flow 200. In some implementations, the operations described above and additional operations may be performed, in whole or in part, by additional devices. For example, one computing device may generate syntax strings, while a second computing device may perform the clustering. As another example, a temporary storage device may be used to store DNS query packets 212 until they may be retrieved by the domain name analysis device 240. In addition, some functionality of various devices may be combined, e.g., the domain name analysis device 240 may also take action in response to identifying potential malware by directly communicating with a client computing device to shut it down. As another example, the domain name analysis device 240 may be integrated in an egress point of the network 215. Other configurations of both the network 215 and the devices within or outside of the network 215 may also be used.

Figure 3:
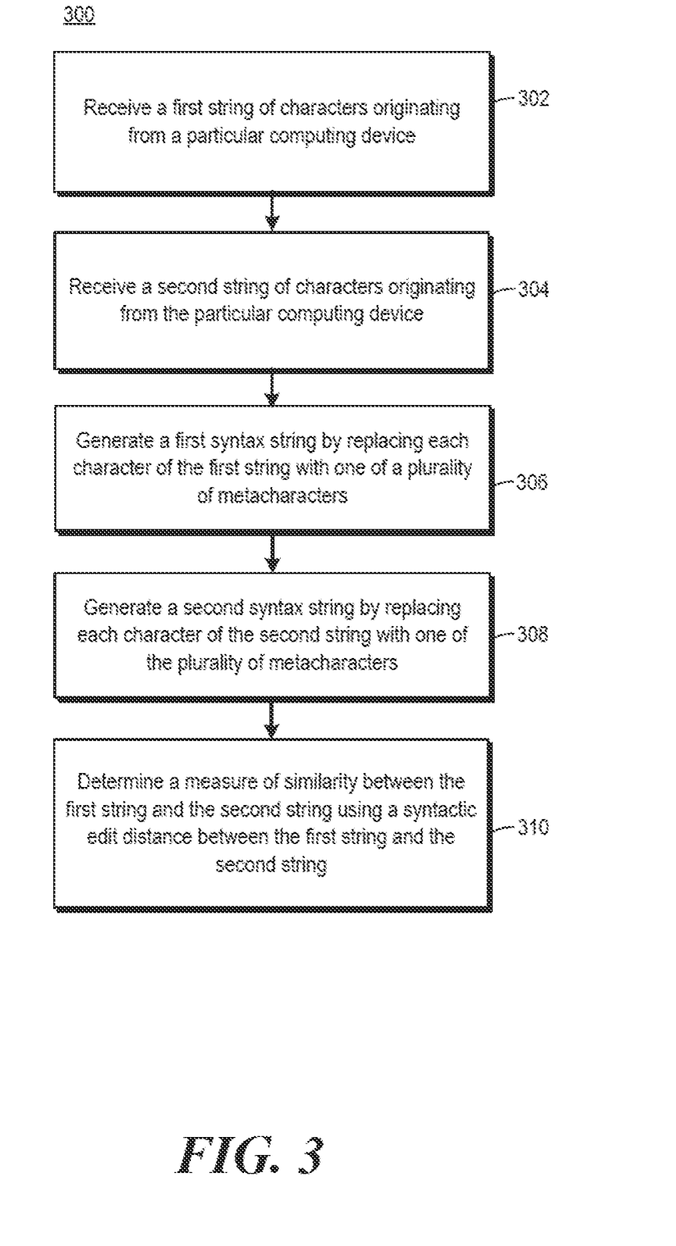
FIG. 3 is a flowchart of an example method for determining string similarity using syntactic edit distance.

FIG. 3 is a flowchart of an example method 300 determining string similarity using syntactic edit distance. The method 300 may be performed by a computing device, such as a computing device described in FIG. 1. Other computing devices may also be used to execute method 300. Method 300 may be implemented in the form of executable instructions stored on a machine-readable storage medium, such as the storage medium 120, and/or in the form of electronic circuitry.

A first string of characters originating from a particular computing device is received (302). For example, the first string of characters may represent a domain name being queried and included in a DNS query packet received from a client computing device. An example first string may be "www.example123.com."

A second string of characters originating from the particular computing device is received (304). For example, the second string of characters may represent another domain name being queried in another DNS query packet from the client computing device. An example second string may be "www.uwqnci3p21.net."

A first syntax string is generated by replacing each character of the first string with one of a plurality of metacharacters (306). Each metacharacter represents a category of characters, and each category is different from each other category of characters represented by each other metacharacter. For example, the example first string may be represented by the syntax string "LLLPLLLLLLLDDDc," where 'L' represents lower-case letters, 'P' represents a period, 'D' represents a numerical digit, and 'c' represents ".com." In this example, a single metacharacter is used to represent the TLD, though in some implementations each character of the TLD may be separately represented.

A second syntax string is generated by replacing each character of the second string with one of the plurality of metacharacters (308). Using the example metacharacters above, the second example string may be represented by the syntax string "LLLPLLLLLLDLDDn," where the metacharacter 'n' represents ".net."

A measure of similarity is determined between the first string and the second string using a syntactic edit distance between the first string and the second string (310). The syntactic edit distance between the first and second string is determined based on the first and second syntax strings. For example, a measure of similarity may be the edit distance between syntax strings. In this situation, the measure of similarity between "www.example123.com" and "www.uwqnci3p21.net" is the edit distance between "LLLPLLLLLLLDDDc" and "LLLPLLLLLLDLDDn," which is 3.

In some implementations, the measure of similarity between the first and second string may be determined based on the edit distance between the first and second string. For example, using formula (1) described above with reference to FIGS. 2A and 2B, the measure of similarity between "www.example123.com" and "www.uwqnci3p21.net" is 0.75(1−(3/12). This relative measure of similarity provides an indication of the syntactic similarity of the two strings.

In some implementations, the particular computing device from which the first and second string are received is identified as a potential source of malicious software based on the measure of similarity between the first string and the second string. For example, if the similarity measure is above a predetermined threshold, the computing device may be identified as potentially infected with malware. In some implementations, receipt of additional strings may facilitate determining similarity between strings and clustering similar strings.

For example, additional strings of characters, such as additional domain names in DNS queries, may be received from the particular computing device. For each additional string, syntax strings may be generated, e.g., using the same metacharacters used to generate the first and second syntax strings. For each additional string, measures of similarity may be determined between the first string, second, string, and other additional strings. In this situation, the result is a set of strings that each has a measure of similarity to each other string.

Each string may be clustered into one of multiple clusters based on the measures of similarity. Various clustering algorithms may be used to cluster the strings, and the resulting clusters will generally each include strings that are more syntactically similar to other strings in the cluster than they are to strings included in other clusters. The clusters may be used to identify the particular computing device as a potential source of malicious software. E.g., as described above, large clusters and a large number of relatively large clusters, may be indicative of the use of a DGA, which may in turn be indicative of malware.

The foregoing disclosure describes a number of example implementations for determining string similarity using syntactic edit distance. As detailed above, examples provide a mechanism for detecting anomalies by analyzing DNS query packets and clustering syntactically similar domain names and potential applications of a system that is capable of determining string similarity using syntactic similarity.

I claim:

1. A non-transitory machine-readable storage medium encoded with instructions executable by a hardware processor of a computing device for determining string similarity, the machine-readable storage medium comprising instructions to cause the hardware processor to:

receive domain name system (DNS) query packets that were sent by a particular client computing device, each DNS query packet specifying a query domain name;

generate, for each query domain name included in the received DNS query packets, a syntax string by replacing each character of the query domain name with one of a plurality of metacharacters, each of the plurality of metacharacters representing a category of characters that is different from each other category of characters represented by each other metacharacter in the plurality of metacharacters;

determine, for each query domain name included in the received DNS query packets, a syntactic edit distance between the query domain name and each other query domain name included in the received DNS packets, the syntactic edit distance between query domain names being determined based on syntax strings of the corresponding domain names;

cluster each query domain name included in the received DNS query packets into one of a plurality of clusters based on the syntactic edit distances; and identify the particular client computing device as a potential source of malicious software based on the plurality of clusters.

2. The storage medium of claim 1, wherein the instructions further cause the processor to:

generate, for each syntax string, a sorted syntax string by sorting the metacharacters of each syntax string, and wherein the syntactic edit distance between query domain names is determined based on the sorted syntax strings of the corresponding domain names.

3. The storage medium of claim 1, wherein each syntactic edit distance between query domain names is determined based on an edit distance between syntax strings of the corresponding query domain names.

4. The storage medium of claim 1, wherein the particular client computing device is identified as a potential source of malicious software in response to determining that one of the plurality of clusters includes a number of query domain names that exceeds a threshold number of query domain names.

5. The storage medium of claim 1, wherein at least one category of characters represented by one of the plurality of metacharacters includes at least one of:
   alphabetical letters;
   lower-case letters;
   upper-case letters;
   vowel letters;
   consonant letters;
   foreign language characters;
   digits;
   punctuation marks;
   dashes;
   periods;
   underscores; or
   unprintable characters.

6. A computing device for determining string similarity, the computing device comprising:
   a hardware processor; and
   a data storage device storing instructions that, when executed by the hardware processor, cause the hardware processor to:
      obtain, from at least one network egress point of a network, domain name system (DNS) query packets that were sent by at least one computing device operating on the network, each DNS query packet specifying a query domain name;
      generate, for each query domain name included in the DNS query packets, a syntax string by replacing a subset of the characters of the query domain name with one of a plurality of metacharacters, each of the plurality of metacharacters representing a category of characters that is different from each other category of characters represented by each other metacharacter in the plurality of metacharacters;
      determine, for each query domain name, a syntactic edit distance between the query domain name and each other query domain name included in the DNS query packets, the syntactic edit distance between the query domain name and each other domain name being determined based on the syntax string of the query domain name and each syntax string of each other domain name;
      cluster each of the query domain names into one of a plurality of domain name clusters based on the syntactic edit distances between the query domain names; and
      determine, based on the plurality of domain name clusters, use of a domain name generation algorithm by the at least one computing device operating on the network.

7. The system of claim 6 wherein the instructions further cause the processor to:
   generate, for each syntax string, a sorted syntax string by sorting the metacharacters of each syntax string, and wherein the syntactic edit distance between query domain names is determined by:
calculating an edit distance between sorted syntax strings of the corresponding domain names.

8. The system of claim 6, wherein each syntactic edit distance between query domain names is determined by:
calculating an edit distance between syntax strings of the corresponding query domain names.

9. The system of claim 8, wherein the instructions further cause the processor to:
   determine, for each query domain name, a measure of similarity to each other query domain name, each measure of similarity being determined between a first domain name and a second domain name by:
      determining an edit distance between the first query domain name and the second query domain name; and
      calculating the measure of similarity between the first query domain name and the second query domain name based on the edit distance and the syntactic edit distance.

10. The system of claim 6, wherein use of the domain name generation algorithm is determined based on a number of query domain names in a particular cluster of the plurality of clusters relative to other numbers of query domain names in each of the other clusters of the plurality of clusters.

11. A computer-implemented method for determining string similarity, implemented by a hardware processor, the method comprising executing on the hardware processor the steps of:
   receiving over a computer network a first string of characters and a second string of characters from domain name system (DNS) query packets originating from a particular computing device,
   the second string of characters being different from the first string of characters;
   generating a first syntax string by replacing each character of the first string with one of a plurality of metacharacters, each of the plurality of metacharacters representing a category of characters that is different from each other category of characters represented by each other metacharacter in the plurality of metacharacters;
   generating a second syntax string by replacing each character of the second string with one of the plurality of metacharacters; and
   generating network anomaly data for the particular computing device by determining a measure of similarity between the first string and the second string using a syntactic edit distance between the first string and the second string, the syntactic edit distance between first string and the second string being determined based on the first syntax string and second syntax string.

12. The method of claim 11, further comprising:
   identifying the particular computing device as a potential source of malicious software based on the measure of similarity between the first string and the second string.

13. The method of claim 11, further comprising:
   receiving a plurality of additional strings of characters originating from the particular computing device;
   generating, for each additional string, an additional syntax string by replacing each character of the additional string with one of the plurality of metacharacters; and
   determining, for each additional string, an additional measure of similarity between the additional string and each of the first string, the second string, and other additional strings included in the plurality of additional strings, the additional measure of similarity for each additional string being based on the additional syntax string, the first syntax string, the second syntax string, and syntax strings of each other additional string included in the plurality of additional strings.

14. The method of claim 13, further comprising:

clustering each of the first string, second string, and additional strings into one of a plurality of string clusters based on the measures of similarity and additional measures of similarity; and identifying the particular computing device as a potential source of malicious software based on the plurality of string clusters.

15. The method of claim 11, wherein determining the measure of similarity between the first string and the second string comprises:

determining an edit distance between the first string and the second string; and calculating the measure of similarity between the first string and the second string based on the edit distance and the syntactic edit distance.

* * * * *